UNITED STATES PATENT OFFICE.

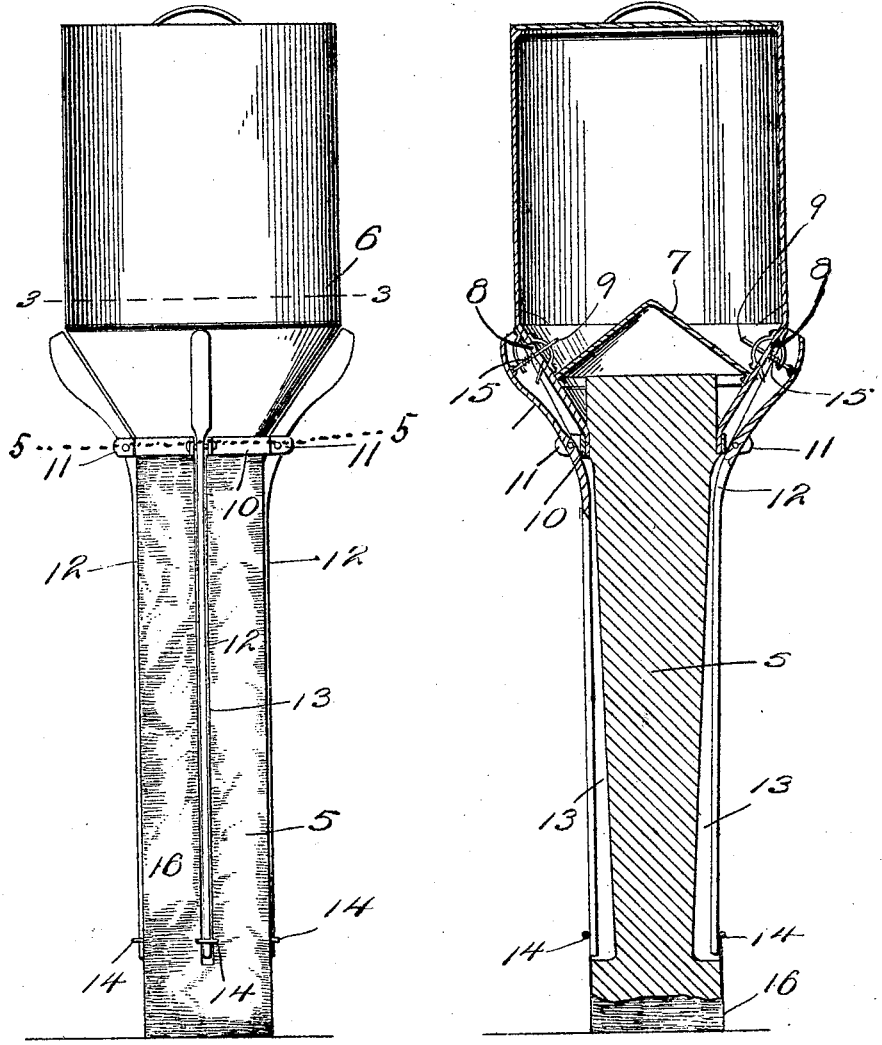

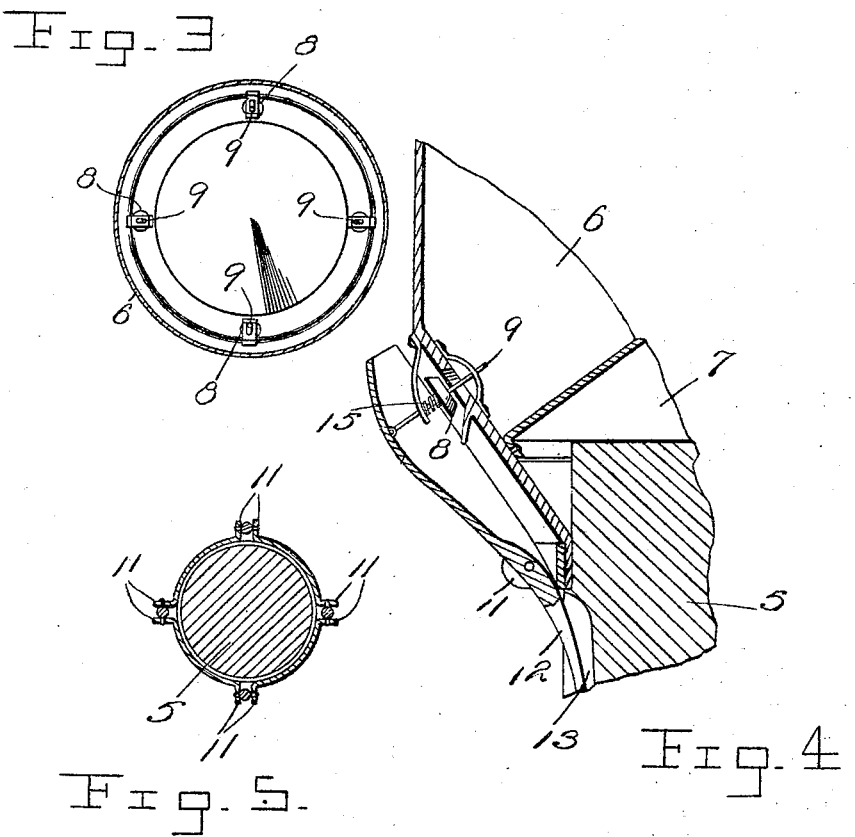

CHARLES M. DAVIDSON, OF ROSWELL, TERRITORY OF NEW MEXICO.

RUBBING-POST.

No. 799,779.        Specification of Letters Patent.        Patented Sept. 19, 1905.

Application filed December 28, 1904. Serial No. 238,649.

*To all whom it may concern:*

Be it known that I, CHARLES M. DAVIDSON, a citizen of the United States, residing at Roswell, in the county of Chaves, Territory of New Mexico, have invented certain new and useful Improvements in Rubbing-Posts; and I do hereby declare the following to be a full, clear, and exact description of the invention, such as will enable others skilled in the art to which it appertains to make and use the same.

This invention relates to rubbing-posts for animals, and has for its object to provide a post so arranged that when an animal rubs a portion of its body thereagainst a fluid will be released from a reservoir and will be directed to strike the body of the animal to relieve any irritation of the skin, it being understood that the liquid within the tank is of a medicinal nature.

A further object is to provide a construction in which the flow of the liquid will be automatically cut off when the rubbing is discontinued.

Other objects and advantages will be apparent from the following description, and it will be understood that modifications in the specific construction shown may be made and that any suitable materials may be used without departing from the spirit of the invention.

In the drawings forming a portion of this specification, and in which like numerals of reference indicate similar parts in the several views, Figure 1 is a view showing the post. Fig. 2 is a longitudinal section through the post and tank. Fig. 3 is a section on line 3 3 of Fig. 1. Fig. 4 is a detailed view showing one of the valves in section and illustrating the latter open. Fig. 5 is a section on line 5 5 of Fig. 1.

Referring now to the drawings, there is shown a post 5, having a tank 6 mounted upon its upper end, the tank being arranged for the introduction of liquid thereinto. The sides of the tank slant downwardly toward the post, and within the tank there is a transversely-extending partition 7, secured at its edges to the slanting portions of the sides, the center of this partition being somewhat raised to cause the liquid placed within the tank to drain toward the edges of the partition. In the slanting portions of the sides are a plurality of needle-valves 8, which communicate with the interior of the tank just above the partition 7, the stems 9 of these valves projecting outwardly, as shown.

Surrounding the post below the tank there is a collar 10, provided with a plurality of pairs of spaced ears 11, one pair of these ears being disposed beneath each of the valves 8, and pivoted between the ears of each pair adjacent to its upper end is a rod 12, these rods being turned outwardly above the collar 10 and being pivoted at their upper ends to the stems 9 of the valve 8. These rods 12 are broadened at their upper ends, and the valves 8 are arranged to discharge liquid from the tank against these broadened portions, it being understood that pivotal movement of the rods moves the stems 9 outwardly, thus opening the valves.

Formed longitudinally in the post 5 are a plurality of grooves 13, each of these grooves being arranged to receive therewithin the lower portion of one of the rods 12, and, as shown, these rods lie normally with the inner edges of their lower portions in the grooves. At the lower ends of the grooves staples 14 are disposed with their bights extending thereacross to prevent disengagement of the rods from the grooves, and within the grooves, between the inner walls thereof and the rods 13, there are disposed springs 15, which hold the rods yieldably in engagement with the staples.

Secured to the post between the rods 12 is a suitable absorbent material 16.

When an animal is affected with a disease causing inflammation of the skin and consequent itching, it will naturally rub the affected part against some object to relieve the suffering, and it is intended that rubbing-posts constructed in accordance with the present invention shall be placed in such a position as to be readily accessible to animals. When an animal rubs against the post, it will naturally select the roughest portions thereof, and as the rods 12 project beyond the surface of the post the animal will rub thereagainst, which will move the rods into the slots and open the valves, as will be readily understood. The liquid will be discharged against the rods and will run down these to the affected portion of the animal's body. Any liquid flowing from the rods will be absorbed by the material 16, from which it will be transferred to the body of any animal rubbing thereagainst.

What is claimed is—

1. In a device of the class described, the combination with a support of a tank secured thereto and provided with valves, and means for operating the valves, said means being arranged for actuation by animals rubbing thereagainst and for conveying liquid from the valves to the body of such animals.

2. In a device of the class described, the combination with a support of a tank secured to the support and arranged for the reception of liquid, and means for releasing the liquid from the tank, said means being arranged for actuation by animals and for conveying the liquid from the tank to the bodies of such animals.

3. A device of the class described comprising an upright, a tank secured to the upright and arranged for the reception of liquid, discharge-valves for the tank, rods connected with the valves for operation thereof and extending downwardly over the upright, means for holding the rods yieldably with the valves closed, said rods being arranged for engagement by the bodies of animals rubbing against the upright to open the valves, said rods being arranged to receive liquid discharged from the valves and to convey said liquid to the bodies of animals rubbing against the rods.

In testimony whereof I affix my signature in presence of two witnesses.

CHARLES M. DAVIDSON.

Witnesses:
H. G. ADDINGTON,
F. P. GAYLE.